US011003710B2

(12) United States Patent
O'Driscoll et al.

(10) Patent No.: US 11,003,710 B2
(45) Date of Patent: May 11, 2021

(54) APPARATUS FOR RECOGNISING AND INDEXING CONTEXT SIGNALS ON A MOBILE DEVICE IN ORDER TO GENERATE CONTEXTUAL PLAYLISTS AND CONTROL PLAYBACK

(71) Applicant: SPOTIFY AB, Stockholm (SE)

(72) Inventors: Brendan O'Driscoll, Dublin (IE); Craig Watson, Dublin (IE); Aidan Sliney, Dublin (IE); Brian Boyle, Dublin (IE); Dave Lynch, Dublin (IE); Lucas M. Braz, Dublin (IE); Clodagh McCarthy Luddy, Dublin (IE)

(73) Assignee: SPOTIFY AB, Stockholm (SE)

(*) Notice: Subject to any disclaimer, the term of this patent is extended or adjusted under 35 U.S.C. 154(b) by 0 days.

(21) Appl. No.: 15/087,428

(22) Filed: Mar. 31, 2016

(65) Prior Publication Data

US 2016/0292269 A1    Oct. 6, 2016

Related U.S. Application Data

(60) Provisional application No. 62/141,414, filed on Apr. 1, 2015.

(51) Int. Cl.
| | | |
|---|---|---|
| G06F 16/632 | (2019.01) | |
| G06F 16/638 | (2019.01) | |
| G06F 16/683 | (2019.01) | |
| G06F 16/60 | (2019.01) | |
| G06F 16/635 | (2019.01) | |

(52) U.S. Cl.
CPC ............ *G06F 16/632* (2019.01); *G06F 16/60* (2019.01); *G06F 16/636* (2019.01); *G06F 16/639* (2019.01); *G06F 16/683* (2019.01)

(58) Field of Classification Search
CPC ......... G06F 17/30749; G06F 17/30761; G06F 17/30764; G06F 17/30766; G06F 16/636; G06F 16/637; G06F 16/639; G06F 16/687; G06F 16/683; G06F 16/632
See application file for complete search history.

(56) References Cited

U.S. PATENT DOCUMENTS 5,848,398 A * 12/1998 Martin ............... G06Q 30/0267
                                                    700/234
6,005,597 A * 12/1999 Barrett ............... H04N 5/44543
                                                    348/564
6,947,922 B1 * 9/2005 Glance .............. G06F 17/30017
                                                    705/26.1

(Continued)

FOREIGN PATENT DOCUMENTS

WO         2013089674         6/2013

OTHER PUBLICATIONS

Elliott et al, PersonalSoundtrack: Context-aware playlists that adapt to user pace, Proceedings of ACM CHI 2006, Apr. 22-28, 2006, Montreal, Quebec, Canada, pp. 736-741. (Year: 2006).*

(Continued)

*Primary Examiner* — Marc S Somers
(74) *Attorney, Agent, or Firm* — Tucker Ellis LLP

(57) ABSTRACT

The invention relates to a system and method to cause an apparatus to perform at least the following; identifying music preferences by understanding the listening history of a user from one or more context signals associated with a user mobile device.

20 Claims, 16 Drawing Sheets

(56) References Cited

U.S. PATENT DOCUMENTS

| | | | |
|---|---|---|---|
| 2006/0167576 A1* | 7/2006 | Rosenberg | G06F 17/30032 700/94 |
| 2006/0242661 A1* | 10/2006 | Bodlaender | G06F 17/30035 725/9 |
| 2007/0233743 A1* | 10/2007 | Rosenberg | G06F 17/30017 707/104.1 |
| 2010/0106799 A1* | 4/2010 | Calabrese | H04L 65/4076 709/217 |
| 2011/0295843 A1* | 12/2011 | Ingrassia, Jr. | G06F 17/30053 707/723 |
| 2013/0018954 A1* | 1/2013 | Cheng | G06Q 10/00 709/204 |
| 2013/0198633 A1 | 8/2013 | Hyman | |
| 2013/0297599 A1* | 11/2013 | Henshall | G11B 27/105 707/736 |
| 2014/0123165 A1 | 5/2014 | Mukherjee et al. | |
| 2014/0277649 A1 | 9/2014 | Chong et al. | |
| 2015/0178624 A1* | 6/2015 | Chee | G06K 9/00 706/11 |
| 2015/0356176 A1* | 12/2015 | Bilinski | G06F 16/635 707/740 |

OTHER PUBLICATIONS

Sutterer et al., "UPOS: User Profile Ontology with Situation-Dependent Preferences Support", Advances in Computer-Human Interaction, 2008 First International Conference on, Jan. 1, 2008, pp. 230-235. (6 pages).

Wang et al., "Context-aware mobile music recommendation for daily activities", Proceedings of the 20th ACM International Conference on Multimedia, MM '12, Jan. 1, 2012. (10 pages).

International Search Report and Written Opinion issued by European Patent Office for PCT application No. PCT/EP2016/057175, dated Jul. 11, 2016. (12 pages).

International Preliminary Report on Patentability for International Application No. PCT/EP2016/057175 dated Jun. 13, 2017, 6 pages.

Anonymous, "iTunes—Wikipedia, the free encyclopedia", Oct. 2, 2013, retrieved from https://web.archieve.org/web/20131002222233/http://en.wikipedia.org/wiki/ITunes#iTunes_Store on Jun. 13, 2019, 22 pages.

Ankolekar et al., "Foxtrot", IWS '11: Proceedings of Interacting with Sound Workshop: Exploring Context-Aware, Local, and Social Audio Applications, ACM, New York, USA, Aug. 30, 2011, pp. 26-31.

Communication pursuant to Article 94(3) EPC, European Patent Office, dated May 31, 2019 for EP Application No. 15718795.6, 6 pages.

Idowu, et al., "NexTrend: Context-Aware Music-Replay Corridors Using NFC Tags", 2013 7th International Conference on Innovative Mobile and Internet Services in Ubiquitous Computing, IEEE, Jul. 3, 2013, pp. 573-578.

\* cited by examiner

CONTEXT SIGNALS

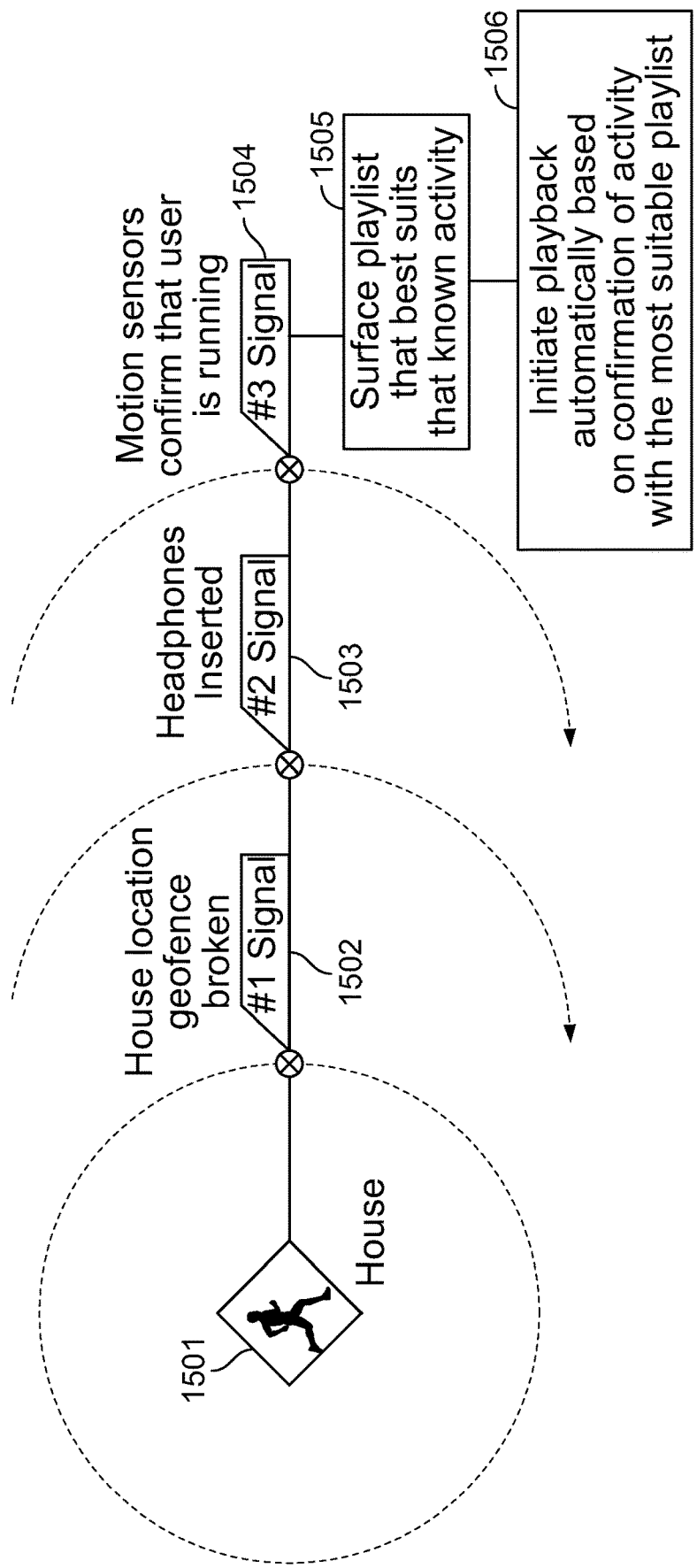

Context Data Identification for a Specific User

| Time  | Description | Playback | Example Context Aware Signals |
|-------|-------------|----------|-------------------------------|
| 07.34 | Users stops alarm on Phone. Remains in bed and opens up music service, initiates playback and goes through email. | 3 songs played in this context | (1) Light Sensor: Low; (2) Location: Home (3) Mobility: Static (4) Phone Orientation: Upright (5) Gesture Signals - typing on touchscreen keypad (6) Third party email app. |
| 07.55 | Users moves to bathroom to shower, initiates playback and puts phone down. | 2 songs played in this context | (1) Humidity Sensor: High (2) Light Sensor: High (3) Location: Home (4) Mobility: Phone flat and static (4) co-present wireless speakers in bathroom. |
| 08.10 | User gets into her car to drive to college. Before leaving initiates playback in drive. | 4 songs played in this Context | (1) Location: Home geofence broken (2) Connects to car audio using co-present device signals (3) Mobility signals recognise that the user is driving |
| 08.23 | User hits a traffic jam while driving to college. Car slows down and crawls along. | 3 songs played in this context | (1) Motion signals recognise car has slowed down (2) Third party app identifies traffic jam |
| 08.59 | User arrives in college. Goes to library and starts studying with headphones in. | 7 songs played in this context | (1) Location: library identified (2) Mobility signals recognise walk from car to static (3) Headphones inserted |
| 12.44 | User goes for lunch and takes a walk to get some fresh air. No further songs played in the library that afternoon. | 3 songs played in this context | (1) Location: library geofence broken (2) Mobility signals recognise walking pattern (3) Environmental signals recognise that it is raining |
| 17.35 | User gets into car to drive to park for weekly jog. | 2 songs played in this context | (1) Location: library geofence broken (2) Connects to car audio using co-present device signals (3) Environmental signal recognises low humidity, high pressure |
| 18.04 | User arrives at park and goes for a run with his headphones in. | 6 songs played in this context | (1) Location: park (2) Connects to smart watch (3) Mobility signals identified as running (4) Heartbeat body signal identified from smart watch (5) Headphones in |
| 19.10 | User gets home and starts cooking dinner. | 3 songs played in this context | (1) Location: home (2) Event trigger in calendar about dinner party at 8pm that night (3) Connects to wireless speakers in kitchen (4) Phone static |
| 22.51 | User goes to bed, dims lights and listens to some relaxing music to go to sleep | 5 songs played in this context | (1) Location: home (2) Llight sensor: low (3) Mobility sensor static (4) Headphones in |

FIG. 16

Context Data Identification for Specific Songs

| Song | User | Known Mobile Signals | Real Life Activity |
|---|---|---|---|
| 'Sussudio' by Phil Collins | John Doe | (1) Location: House (2) Time: 7.30pm (3) Proximity Signal: connected to wireless speakers in kitchen (4) Co-present device owned by wife present in the room (5) Identification of 'dinner' string in event signal from calendar scheduled for 8.30pm | Cooking before a dinner party in the house. |
| 'Violin Concerto in E' by Antonio Vivaldi | Mary Smith | (1) Location: library (2) Time: between 9am and 5pm weekdays (3) Headphones in (4) Mobility is stationary (5) Co-present devices of User: Jane Cole present in library | Studying in library in college with his friend Jane. |
| 'Route 66' by Chuck Berry | Paul Kelly | (1) Mobility sensors detect driving (2) Connected to audio system in car (3) Time: only on a Sunday (4) Environmental signals: high pressure on barometer, low humidity reading (5) Third party signals show route of drive (6) Altitude meter goes up for the duration of the drive. | Going for a Sunday drive when the weather is nice in the local mountains. |
| 'Feeling Good' by nina Simone | Bob Mosley | (1) Mobility sensors detect driving but at a much lower speed (2) Connected to audio system in car (3) Time: between 5p and 6.30pm weekday (4) Environmental sensors: detect rain. | Stuck in a traffic jam on the way home from work. |
| 'Eye of the Tiger' by Survivor | Sandra Stephenson | (1) Location: park (2) Mobility sensors detect jogging (3) Connected to smart-watch co-present device (4) Heartbeat reading of >100 BPM from body sensors (5) Time: Tuesday and Thursday evenings between 6pm and 7pm. (6) Headphones in | Bi-weekly jog in the park |
| 'We are the Champions' by Queen | Joe Jackson | (1) Location: park (2) Mobility sensors detect walking (3) Connected to smart-watch co-present device (4) Heartbeat reading of <80 BPM from body sensors (3) Third party Apple HealthKit identify post run patterns (4) Time: Tuesday and Thursday evenings between 6pm and 7pm. (5) Headphones in | Post bi-weekly jog warm down in the park |

FIG. 17

Context Data Generation for One Specific Song

| Song | User | Known Mobile Signals | Real Life Activity |
|---|---|---|---|
| 'Eye of the Tiger' by Survivor | Ben Player | (1) Location: Near work (2) Timing: 1.11pm on a Tuesday (3) Connected to wearable device (4) Co-present device owned by colleague at work present throughout activity (5) Identification of 'go for jog' string in event signal from calendar (6) Mobility sensors detect jogging (7) Headphones in | Going for a run with a colleague at lunch time around the office locale. |
| | Sophie Lopez | (1) Location: gym (2) Time: 7.25am on a Wednesday (3) Headphones in (4) Mobility is stationary (3) Biometric sensors show heart rate of 145 BPM (5) Proximity sensors pick up wireless speakers in gym | On the treadmill at the gym with phone resting stationary. |
| | Phillip Moerhing | (1) Location: local park (2) Timing: 6.42pm on a Monday (3) Mobility sensors detect jogging (4) Headphones in (5) Light sensors detect that it is getting dark (6) Environmental sensors detect that rain is in the air. | Going for a jog in the local park after work before the weather closes in and it gets dark. |
| | Bill Jones | (1) Location: local mountains (2) Time: 3.32 pm on a Sunday (3) Mobility sensors detect user is cycling (4) Connected to wearable fitness tracker (5) Elevation sensor detects 1014m above sea level (6) Orientation sensors detect steep incline (6) Environmental sensors detect high temperatures | On a cycle on a warm sunny Sunday afternoon in the local mountains, climbing the highest point of the cycle. |
| | Stefanie Chang | (1) Location: library (2) Time: 3.41pm on a Friday (3) Headphones in (4) Mobility is stationary (5) Co-present devices of User: Sue Redden present in library (6) Full song not played, user skipped | User comes across this song in a random playlist while studying and skips the song instantly as it does not suit that activity. |

FIG. 18

INPUT DATA CONDITIONING

DATA MODELLING

APPARATUS FOR RECOGNISING AND INDEXING CONTEXT SIGNALS ON A MOBILE DEVICE IN ORDER TO GENERATE CONTEXTUAL PLAYLISTS AND CONTROL PLAYBACK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to U.S. Provisional Patent Application No. 62/141,414, titled "Apparatus for recognising and indexing context signals on a mobile device in order to generate contextual playlists and control playback", filed Apr. 1, 2015, which is herein incorporated by reference.

FIELD OF INVENTION

The present invention relates generally, as indicated, to a method and apparatus for the indexation and recognition of various context signals on a mobile device.

DESCRIPTION OF RELATED ART

At the time of writing there are currently more than 2 billion smartphone devices in the world. These smartphones perform many of the functions of a computer, typically having a touchscreen interface, Internet access, and an operating system capable of running downloaded apps.

Increasingly, these smartphone devices are manufactured with built-in sensors that measure motion, orientation, and various environmental conditions. These sensors are capable of providing raw data with high precision and accuracy, and are useful if you want to monitor three-dimensional device movement or positioning, or you want to monitor changes in the ambient environment near a device.

This advancement in mobile hardware has also been accompanied by the increased portability of media through the benefits of the client to server relationship on which these electronic devices operate. This means that media, and music specifically, can be accessed by smartphone owners on demand and in a number of different ways. For example, music can be consumed by listening to local MP3 files on the phone itself or through access to the Internet or through dedicated apps on the phone which host such music in the cloud.

In addition, the rise of on demand music streaming services with their vast catalogues of millions of songs means that ownership of a physical music file or a digital music file is no longer required to enjoy music. The state of the art allows subscribers to access this content whenever and wherever they want on their smartphones through any number of free or paid subscription services. The net result is that it has never been easier to listen to music on the go.

The existence of all this easily accessible content has led to consumers now facing an overwhelming song choice as there are often over 20 million tracks available on most of the established content providers. In order to combat this 'search bar paralysis' when looking for music, a number of services have introduced dedicated playlist functionality to allow consumers to sort and make sense of these vast databases of music.

The curation of music into playlists or other queues of specific songs is well established but despite these advancements in both mobile hardware and the ease of access to media content, the method for playlist generation has not evolved at the same pace. Music services like Songza highlighted the advantages of situational awareness when a user is choosing what music to listen to. For example, a user would be prompted on a Tuesday morning to choose between playlists that best suited various desired results such as; 'Brand New Music', 'Still Waking Up', 'Working (with lyrics)', 'Working Out', 'Taking the Day Off' or 'Easing the Tension'. Although this human curation is helpful in limiting the scope of suggested songs that would suit each particular environment, it still requires such input in the first instance.

Although the majority of existing music services have some form of playlist functionality, there is an onus on the music service subscriber to manually select a playlist to suit each particular situation. Furthermore, there is no logic built into these music services to understand what a user was doing historically when listening to specific songs. As such, the current state of the art for playlist generation still requires an unnecessary amount of manual input or is reactive at best.

By way of example, if a user decides to go for a run and wants to listen to music during that activity, they can bring their smartphone with them and choose an upbeat playlist to suit that particular context. A simple search of the popular music service for the term 'jogging' returns hundreds of playlists either created by Spotify or by Spotify users. A user can then choose this playlist, plug in their headphones and go for a run. The next time that users goes for a run, they will need to repeat the process, manually selecting their playlist of choice again. The fact that they listened to certain songs when jogging previously is not classified and so the future generation of playlists cannot improve without including such contextual signals.

This is not an efficient process and is completely removed from the technological advancements present in the current state of the art. Taking the example of a jogger again, the latest iPhone devices (5S onwards) contains a motion coprocessor that can handle data from the iPhone's sensors (the accelerometer, gyroscope and compass) without triggering the phone's SoC. This means that the latest models of iPhone never stop collecting data turning the smartphone device into a perpetual fitness tracker that can serve up data about a user's movements. We are therefore moving into an era of the quantified self, where sensor fusion and mobile computing power increases to provide a detailed analysis of a person's movements and health throughout the day.

It would be expected that such motion data could be analysed in the context of what songs were listened to during a particular activity such as jogging. This would allow for a music service to better understand what playlists to suggest to a subscriber when they are next going for a jog. To develop this further, a subscriber to such a service should in fact be able to go for a run and if they have their headphones in for example, this could trigger the playback of music automatically to suit that particular situation. The subscriber should not have to even initiate the play button. The playlist would generate automatically to suit that environment as the mobile signal triggers that the user is going for a run. This playlist could update as the situation changes (e.g., queue higher tempo songs if the jogger's pace has slowed significantly).

Motion sensors are only one example of mobile signals that are not currently being used to marry situational awareness with content playback. The Samsung S5 smartphone device also contains amongst other sensors, a heart rate sensor, a finger sensor, a barometer, a light sensor, a proximity sensor, a gesture sensor and a hall sensor. There are also numerous signals available from other third party services such as Google Fit and Apple's HealthKit which store aggregated data in the cloud.

Instead, the current state of the art requires a user to trigger playback and to manually choose the playlist that they would like to listen to. With the widespread adoption of smartphones and the rise of built-in sensors and mobile signals, there should be a better way to generate playlists based on an improved method and apparatus for recognising and indexing context signals on a mobile device and marrying this information with content playback.

SUMMARY

The invention solves the above mentioned problem by understanding what music an individual has listened to in various situations by utilising the mobile signals provided by the individual's smartphone sensors on the device and other third party signals. The invention can also store this data as a separate type of metadata, in addition to the typical metadata generally associated with the playback of media such as ID3 tags. This information can then be used to generate contextual playlists for any given situation whether environmental, motion based or other at any point in the future.

There are multiple applications of how the invention can work to improve situational awareness in order to improve the accuracy of the music suggested and consumed on a music service. Further embodiments of the various applications have been set out below.

The present invention is an improvement over conventional systems in that method and apparatus for generating more accurate playlists and song recommendations by recognising and indexing context signals on a mobile device in order to understand and promote songs for any given situation. In addition this information can be stored for subsequent use by indexing these mobile signals as a new form of metadata for any particular song in order to improve recommendations in the future. This invention is both unique and an improvement over the prior art.

It is therefore an object of the present invention to provide a new and improved method and apparatus for the identification of a new form of song metadata utilising the motion sensors on a smartphone device.

It is therefore an object of the present invention to provide a new and improved method and apparatus for the identification of a new form of song metadata utilising the environmental sensors on a smartphone device.

It is therefore an object of the present invention to provide a new and improved method and apparatus for the identification of a new form of song metadata utilising the proximity sensors on a smartphone device.

It is therefore an object of the present invention to provide a new and improved method and apparatus for the identification of a new form of song metadata utilising the biometric sensors on a smartphone device.

It is therefore an object of the present invention to provide a new and improved method and apparatus for the identification of a new form of song metadata utilising the gesture sensors on a smartphone device.

It is another object of the present invention to provide a new and improved system and method that is capable of working with real-time GPS location-based systems as well as pre-loaded mapping software on smartphones.

It is another object of the present invention to provide a new and improved system and method that is capable of working with date/event based systems so that such information is filterable by time and identified.

It is another object of the present invention to provide a new and improved system and method that is capable of working with third party signals to further understand the context around music consumption.

It is another object of the present invention to provide a new and improved system and method that is capable of working with co-present device signals to further understand the context around music consumption.

It is another object of the present invention to provide a new and improved system and method of affixing the information collected through the various mobile signals in order to create a new form of contextual metadata.

It is another object of the present invention to provide a new and improved system and method that is capable of utilising this contextual metadata to surface the best music recommendations and playlists for any given situation.

It is another object of the present invention to provide a system of data conditioning and/or modelling to predict user behaviour.

It is another object of the present invention to provide a new and improved system and method that uses real-time notifications to provide suggested playlists.

It is another object of the present invention to provide a new and improved system and method that can update playlists in real-time.

It is another object of the present invention to provide a new and improved system and method that is capable of being used by music services to provide users with the ability to trigger music playback based on their activities instead of manually initiating playback.

Other objects, features and advantages of the invention will be apparent from the following detailed disclosure, taken in conjunction with the accompanying sheets of drawings, wherein like reference numerals refer to like parts.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which:

FIG. 15 is a diagram of a user going for a jog while using the system of automatic playback initiation.

FIG. 16 is a table illustrating a typical day of a fictitious user monitoring their activity.

FIG. 17 is a table illustrating what songs a number of fictitious users listen to throughout the day.

FIG. 18 is a table illustrating the identification of context signals for one particular song.

DETAILED DESCRIPTION

Figure 1:
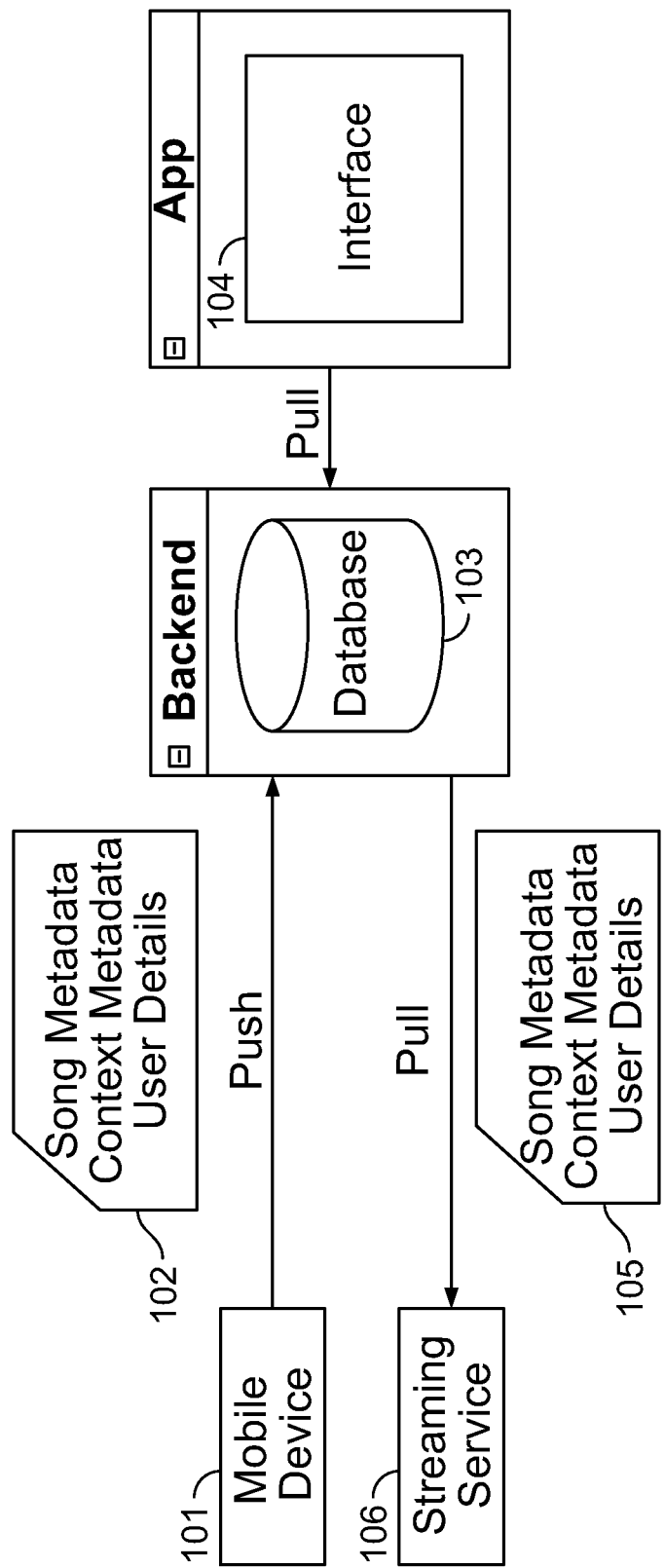
FIG. 1 is a diagram of a system for identifying played content on a mobile device.

A method and apparatus for the recognition of various mobile signals on a smartphone device to improve the overall situational awareness in order to generate the most efficient type of playlist for any given context.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

FIG. 1 is a diagram of a system for identifying played content on a mobile device, according to one embodiment. By way of example, the communication between push of song metadata, context metadata and user details at 102 between the device 101 and the backend database 103 and the communication between the pull of song metadata, context metadata and user details at 105 between the backend 103 and the content provider 106 can include one or more networks such as a data network (not shown), a wireless network (not shown), a telephony network (not shown) or any combination thereof.

The system set out in FIG. 1 includes a music identification service 101, 102, 105 and 106 and a database interface process 103. The system includes instructions for finding metadata about music or other audio files. The database interface process 103 is the interface between the device 101 and the content database 106, and is used to retrieve and store metadata, and to retrieve and store content.

In the illustrated embodiment, the services include played content identification process 102 and 105 to identify played music or other audio metadata, other contextual metadata together with user details and to use the database interface process 103 to store and retrieve the event data that describes what is being played, where it being played, when it is being played and by whom.

In some embodiments of 102 and 105 the user ID field 102 and 105 may be used, such as a node identifier for the device used for playback, a user supplied name, an email address or an ID assigned to a user who registers with a content service system (e.g., Facebook). In steps 102 and 105, the timestamp field is also retrieved which holds data that indicates when the event occurred on the device that plays the content. In some embodiments, the timestamp is omitted. In some embodiments, the field holds data that indicates a name of the content and a name of an artist who generated the content, such as song title and singer name. This content ID, if a music file, often contains the genre of the music played together with the song duration and other related metadata and other references including, but not limited to, International Standard Recording Codes (ISRC). In other embodiments of 102 and 105, contextual metadata is also recorded at the point of listen and such contextual metadata is described in further details in FIGS. 4 and 5.

In circumstances where the music or audio metadata is not stored on the device 101, and pushed 102 to the database 103, often a Content Distribution Network (CDN) as embodied in 106 is the source of the music or audio metadata. Typically, the music store authorizes the CDN to download the client and then directs a link on the user's browser client to request the content from the CDN. The content is delivered to the user through the user's browser client as data formatted, for example, according to HTTP or the real-time messaging protocol (RTMP). As a result, the content is stored as local content 106 on the user's device 101. The local content arrives on the device either directly from the CDN or indirectly through some other device (e.g., a wired note like other host) using a temporary connection (not shown) between mobile terminal for example and other host.

Once this information has been added to the database 103 and stored locally, the application itself 104 on a user's mobile device can then be used to access and retrieve the music, user details or other contextual metadata.

Figure 2:
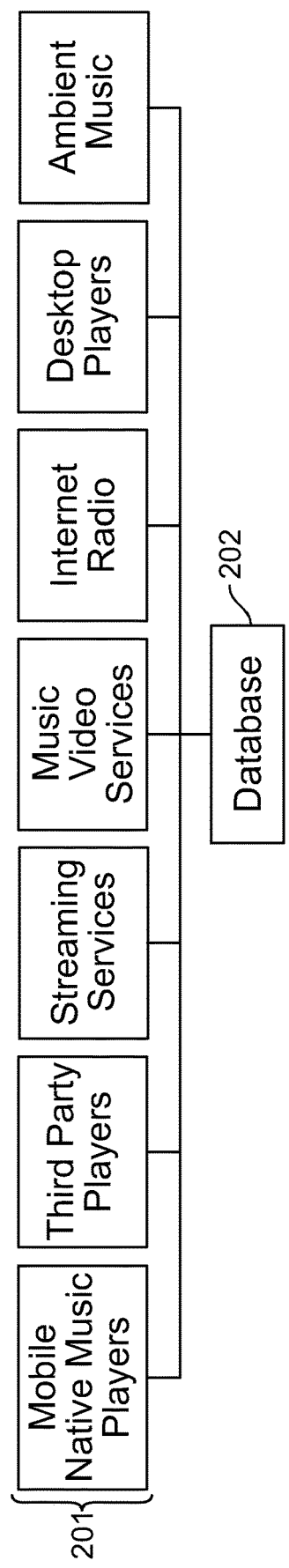
FIG. 2 describes a number of sources where song metadata can be captured.

FIG. 2 describes a number of sources 301 where song metadata can be captured including but not limited to mobile native music players, third party players, streaming services, music video services, internet radio, desktop players and ambient music. For each of these sources of audio, this song metadata can then be stored in a database. As will be described later, user details and contextual metadata about what a user was doing when the audio was captured can also be appended to such metadata and stored with in it in a database.

Figure 3:
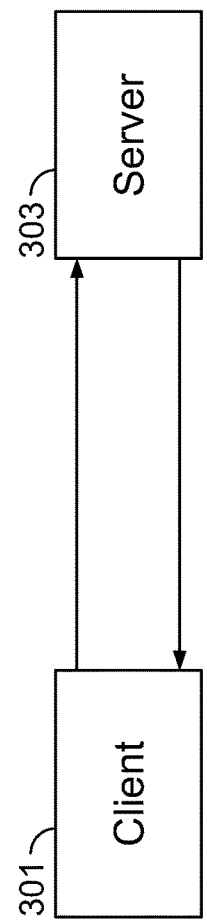
FIG. 3 is a diagram of the server to client interaction.

FIG. 3 is a diagram of the server to client interaction that is used to implement an embodiment of the invention. The client-server model of computer process interaction is widely known and used. According to the client-server model, a client process 301 sends a message including a request to a server process 303, and the server process responds by providing a service. The server process 303 may also return a message with a response to the client process 301. Often the client process 301 and server process 303 execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" 301 and "server" 303 refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 4:
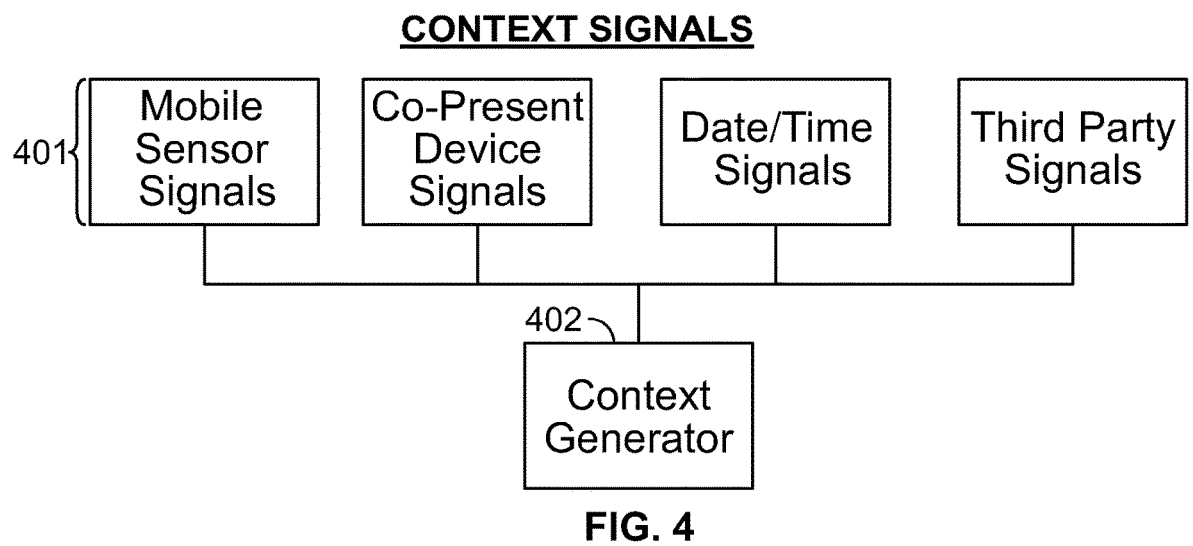
FIG. 4 is a description of the various types of context signals.

FIG. 4 is a description of the various types of context signals 401 that are fed into the context generator 402 in order to better understand what a user is doing at any point of time. Such context signals are continuously being generated, both when a user is listening to music or not listening to music. For the purposes of this embodiment, we are primarily concerned with the receipt of context signals 401 and context generation 402 at times when the user is listening to music. Of course, the receipt of context signals 401 can also occur when a user is not listening to music but such signals are not described in further detail and do not form part of the context generation 402 for the purposes of this invention. The context signals 401 can consist of mobile sensor signals (as outlined in FIG. 5) which in the aggregate can provide sensory fusion to give a better picture about a user's behaviour at any point of time. Context signals 401 can also be received from co-present devices such as wireless speakers in the home, the audio system in a car or other mobile devices present within a set location proximity. Such co-present device signals can help pinpoint where a user is when listening to music. Context signals 401 can also include date and time signals which provide information about when a user listened to a music. Finally, context signals 401 may include third party signals such as signals from other available APIs (such as a calendar application) or cloud stored content (such as HealthKit on the iOS platform). All or some of the above can then be appended to the song metadata for context generation 402 about what a user is doing, where they are and when they have listened to music.

Figure 5:
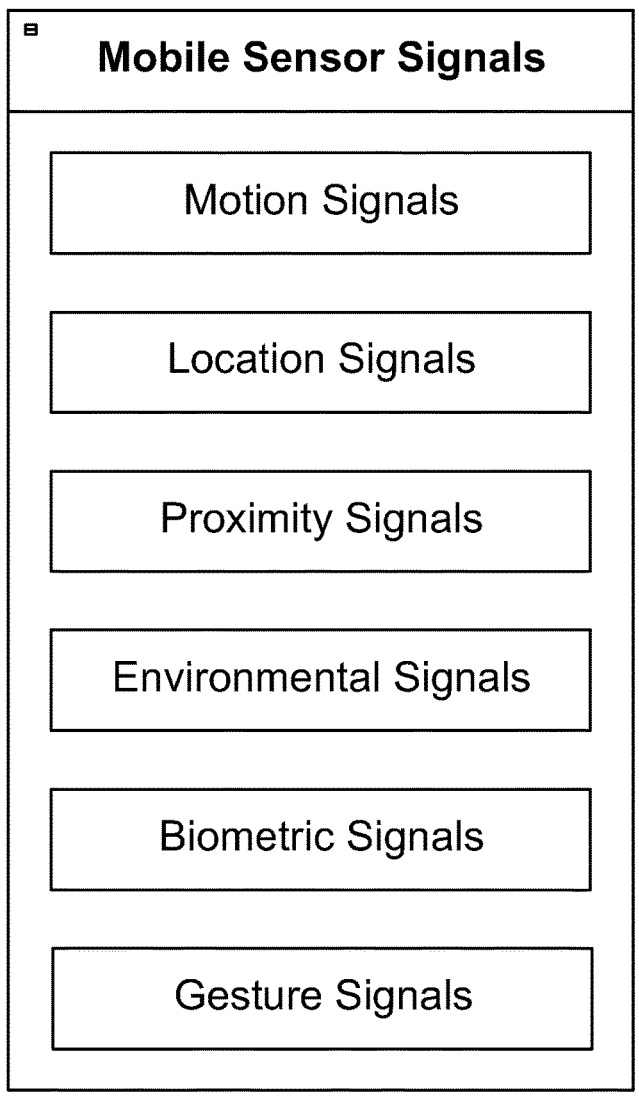
FIG. 5 is a diagram of some of the mobile signals available.

FIG. 5 is a diagram of some of the mobile signals that are currently available in the state of the art, including but not limited to, motion signals, location signals, proximity signals, environmental signals, biometric signals and gesture signals. For example, motion signals are provided by certain sensors available on the latest mobile devices such as an accelerometer, gyroscope, elevation sensor and compass. One or a combination of these sensors can be used to work out if an end user is walking, cycling or jogging and can work out the acceleration of the activity, the orientation and the terrain. Location signals can include GPS and other location services that allow a user's location to be identified at any point of time. Proximity signals include indoor positioning systems such as WiFi and Bluetooth which allows mobile devices to locate objects or people inside a building using radio waves. Environmental signals are those that surface environmental conditions using barometers and humidity sensors. Biometric signals originate from the sensors aimed at quantifying the health and activity of a user and may include the likes of heart rate sensors and blood pressure sensors. Finally, gesture signals such as the positioning of the head or hands to the phone can be used to infer certain behaviours. Sensory fusion can be used to aggregate all available mobile sensor signals in order to assist with context generation around a specific listening use case.

Figure 6:
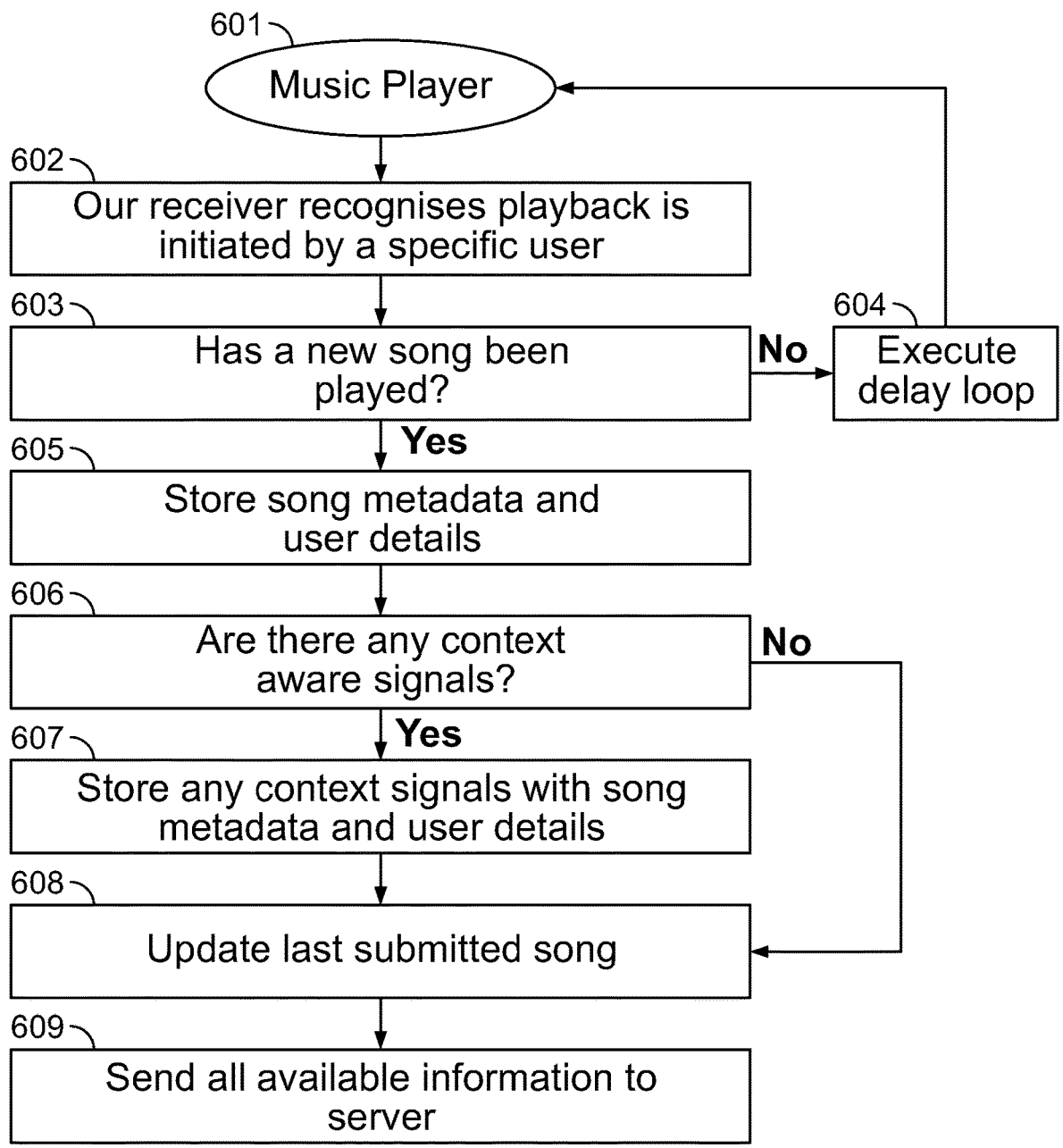
FIG. 6 is a schematic view of the classification system used.

FIG. 6 is a schematic view of the classification system that identifies what music has been played by a specific user and how it is stored with other available contextual metadata. Once a user executes the music player 601 a receiver recognises that playback has been initiated by a specific user 602. The system then checks if a new song has been played 603 which ensures that the same song is not stored twice. If no new song has been played since playback was last initiated, the system executes a delay loop 604 and checks again at a future point in time as specified by a system. If a new song has been played, the system stores the available song metadata along with the user details 605. Next, it is checked to see if there are any other context signals 606 (as further outlined in FIG. 4) including but not limited to mobile sensor signals, co-present device signals, date/time signals and third party signals. We then store any context signals with the song metadata and user details 607. This allows us to build up a profile about a user's behaviour when listening to music. We then update the last submitted song 608. If no such context signals are available, we skip step 607 and just update the last submitted song 608. Finally, we send all available information to the server 609.

Figure 7:
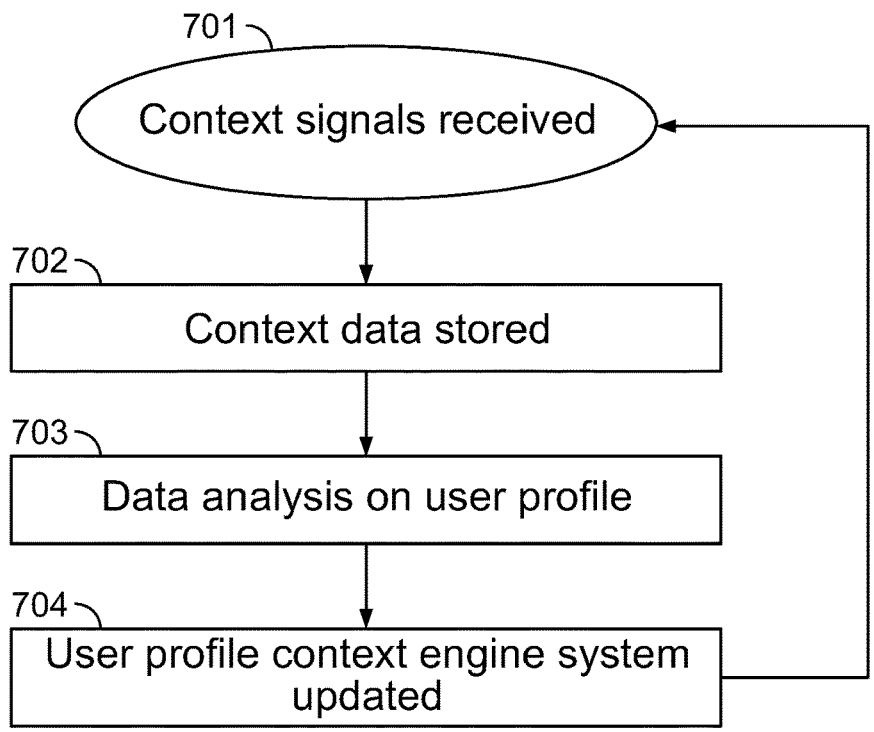
FIG. 7 is a schematic view of the user profile context engine.

FIG. 7 is a schematic view of the user profile context engine. In this system, we are able to build up a profile over time to analyse what music a specific user is playing and marry this information with any available context signals received 701. This context data is then stored 702 and the system carries out data analysis on the user profile 703. The user profile context engine system is then updated 704 with following this analysis to gain a better understanding of a user's listening preferences and the context in which this music was played. A practical example of how this user profile context engine system operates is set out in FIG. 16. The longer the system is running and the more contextual data points accumulated on a user, the more effective the context engine system becomes and this is important for the purposes of generating the right playlists at the right time, as will be described in further detail later. The user profile context engine system uses a combination of well-known algorithms in the field of computer science and data modelling to work out the frequency of known activities (clustering), data conditioning of those known activities by labelling each one.

Figure 8:
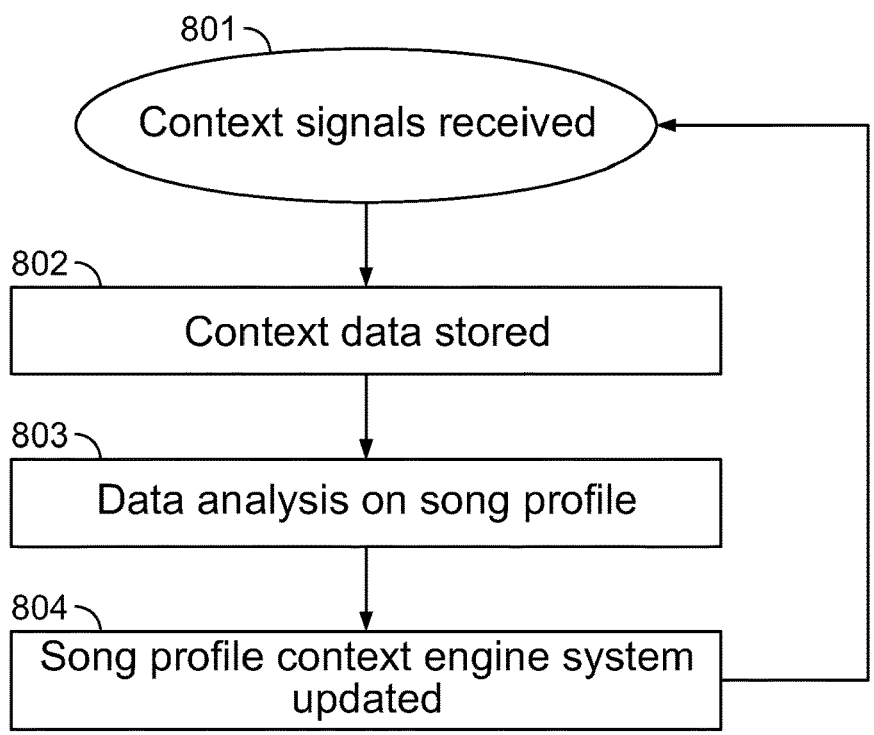
FIG. 8 is a schematic view of the song profile context engine system.

FIG. 8 is a schematic view of the song profile context engine system. In this system, we are able to build up a profile over time around a specific song to analyse what are the most common context signals received 801 for that particular song. For example, we may know that one particular song is often used by listeners to motivate themselves in the gym. This context data is then stored 802 and the system carries out data analysis on the song profile 803. The song profile context engine system is then updated 804 with following this analysis to gain a better understanding of who, where, when and why a particular songs is listened to. A practical example of how this song profile context engine system operates is set out in FIG. 17. The longer the system is running and the more contextual data points accumulated on any particular song, the more effective the context engine system becomes. In hosting the database of context data for each particular song, it is the intention to build out a new form of classification system. Music services could therefore use a library of context data to provide better song recommendations and serve up the most fitting playlists for different scenarios, according to one embodiment of the invention. Such a classification system could be used by the music industry to understand the context around listening habits. App developers could also use such a classification system to target specific users when they know that a particular activity is happening.

Figure 9:
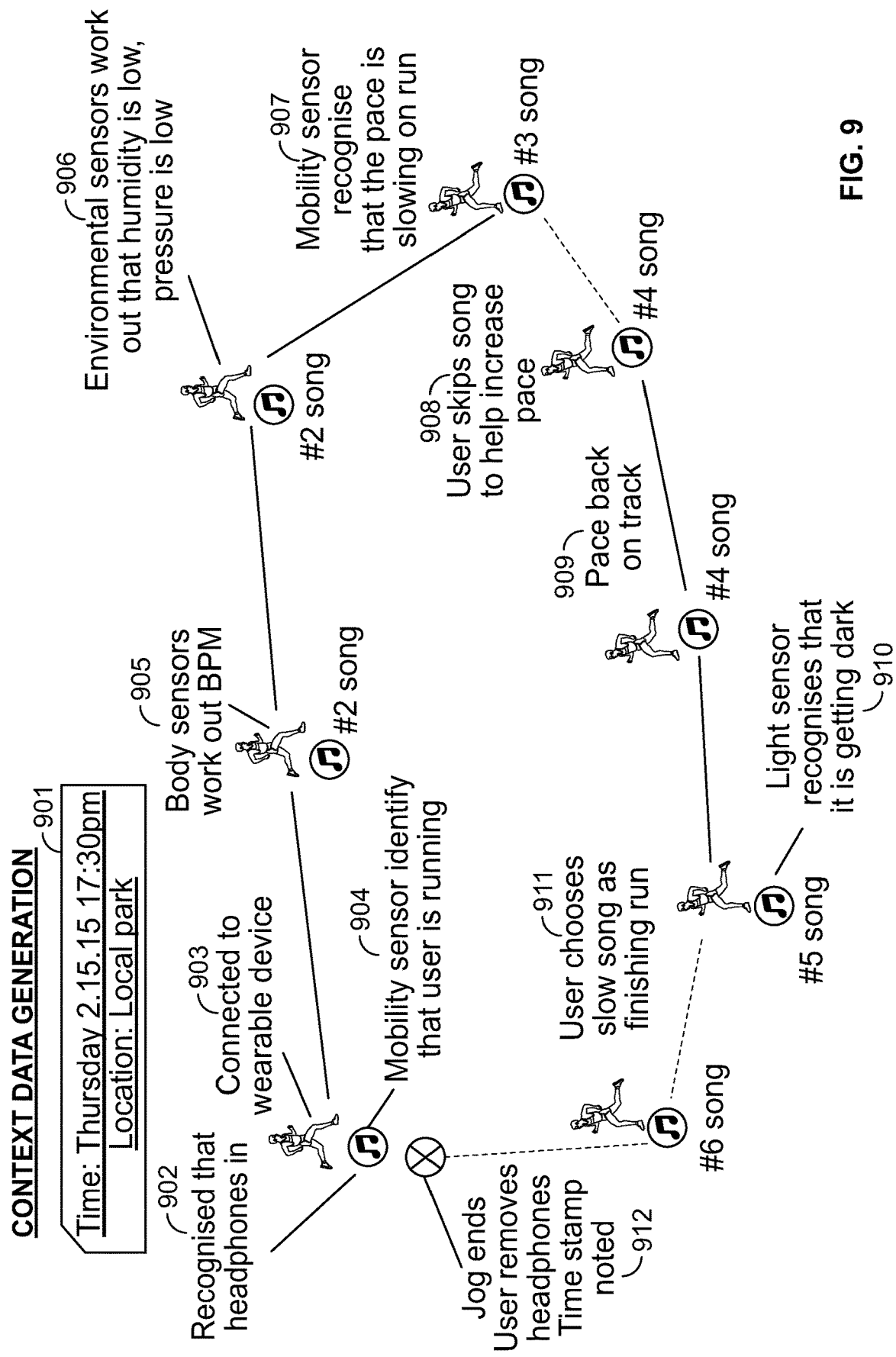
FIG. 9 is a diagram of a user going for a jog in her local park highlighting the context data identification system.

FIG. 9 is a diagram of a user going for a jog in her local park on 15 Feb. 2015 at 5.30 pm 901. In this example, there are a number of context signals which are built up over the course of the jog. When the user inserts her headphones into the phone 902, this gesture signal is recognised indicating that the user is about to start listening to music. Next the mobile device is connected to a wearable device 903 that the user also owns which measures biometric information such as her heart rate. The motion signals are then recognised by the system once the user commences her jog 904 and this information is stored as contextual data along with the user's details and song metadata for the first song listened to on her jog. Her biometric data is then recognised at 905 and this information is stored along with song metadata from the second song listened to on her run. Next, environmental sensors work out that she is running in a low pressure environment with low humidity 906. This information is also stored with the user details and song metadata for the second song on her run. The mobility sensors recognise that the user's pace is slowing down 907 and at the same time, the user skips from the third song to the forth song 908 to pick a more upbeat track. With her pace back on track 909, this contextual data is appended to the relevant song information and the user profile context engine is improved. As her run continues, it is recognised that the lights is fading and this contextual data is also stored 910 with the fifth song that listened to on her jog. As she nears the end of her run, the user manually selects a slower song to match her slower pace 911 and this is recognised by the system in the present invention. Finally, it is noted when the user completes her run and returns to her original location 912 removing her headphones and stopping playback.

This is just one embodiment of how context data generation can occur during a daily activity such as jogging and illustrates how there are numerous context signals that can be captured throughout such an activity. This example also shows how both a user profile context engine and a song profile context engine can be generated by monitoring such an activity.

Figure 10:
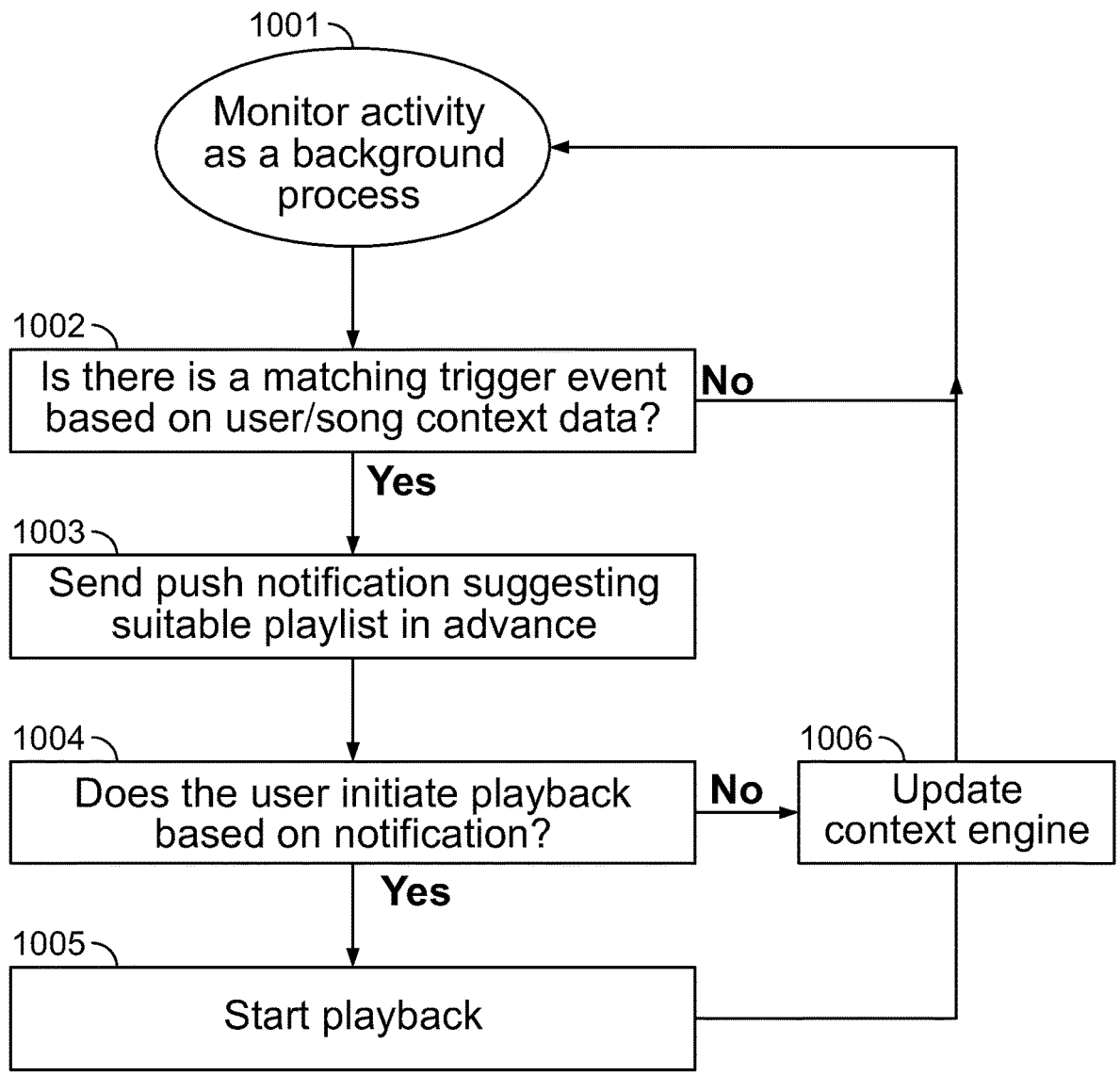
FIG. 10 is a schematic view of the push notification system that is used to proactively engage with users.

FIG. 10 is a schematic view of the push notification system that is used to proactively engage with users. The system monitors activity as a background process 1001 to assess what any specific user is doing. If there is a matching trigger event based on user/song context data 1002, the system will send a push notification to the user's mobile device suggesting a suitable playlist in advance 1003. If there is no such matching trigger event based on user/song context data 1002 then the monitoring process continues 1001 until such an event is confirmed. If a push notification is sent 1003 and the user does not initiate playback based on the notification 1004, this information will be fed into the context engine for that particular user and the notification system will improve 1006. If a push notification is sent and the user initiates playback based on that notification 1004 then, the system will start playback.

For example, the system can monitor that a user has returned home (using location signals) and has connected their mobile device to the wireless speakers in the kitchen (using co-present device signals and proximity signals) at 7 pm (using time/date context signals). Having built up context generation for this specific user, the system knows that such a user listens to music while cooking dinner in the kitchen and understands what songs the users usually listens to during this activity. Accordingly, the system can identify these signals and monitor the fact that the user is going to start cooking and might be interested in listening to a suitable playlist. The system can then send a push notification to the user suggesting a suitable playlist which the user can initiate as they start to cook their dinner.

Figure 11:
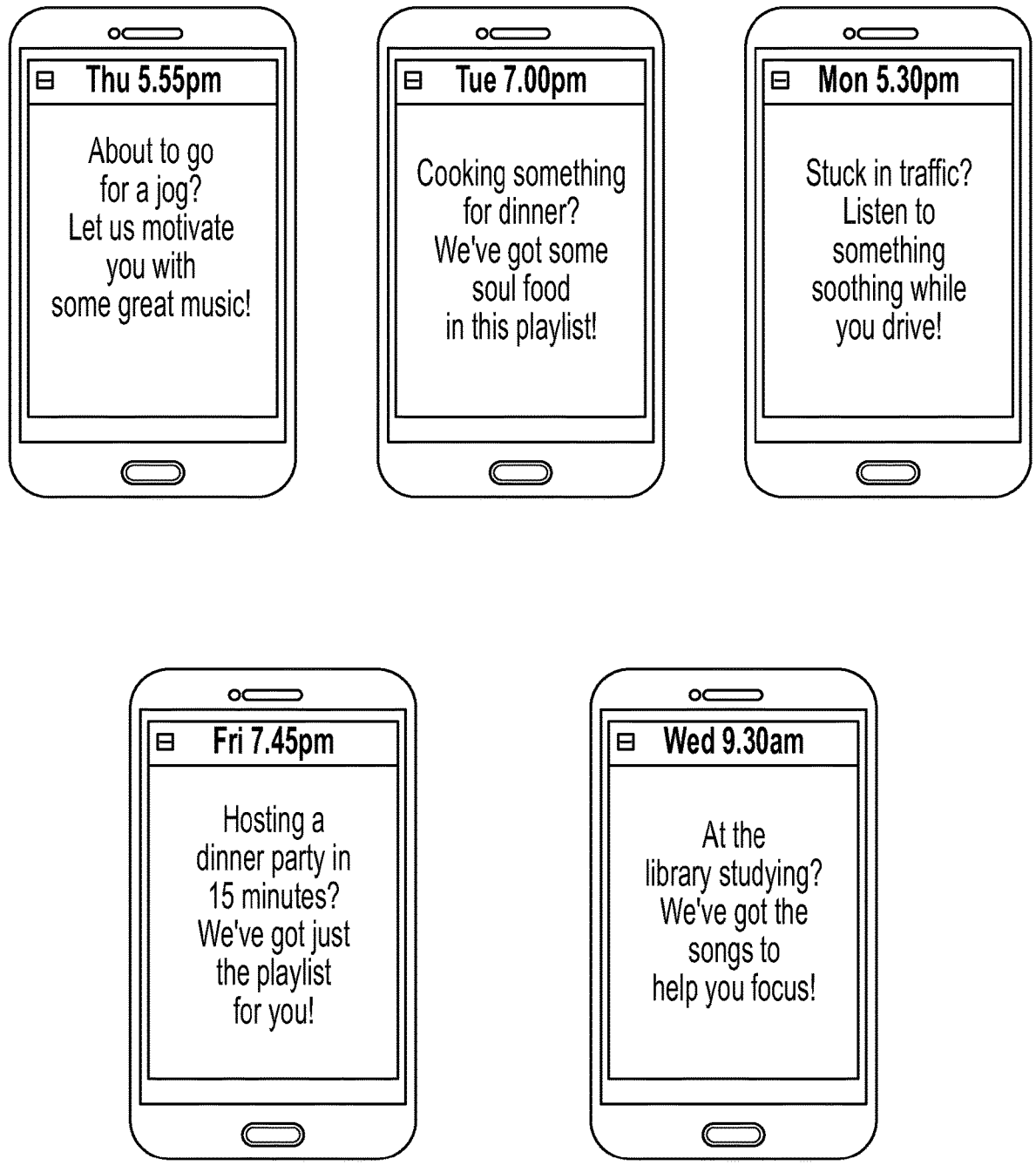
FIG. 11 is an example of a number of push notifications on mobile devices.

FIG. 11 is an example of a number of push notifications on mobile devices that the system could use when pre-empting the music listening preferences of a specific user. In the above example, the user profile context engine system knows that on Thursday afternoon at work, the user typically goes for a jog at 6 pm in his local park. We can therefore suggest some suitable music to listen to with some copy such as 'About to go for a jog? Let us motivate you with some great music!'. A user profile context engine system also knows that a user likes to listen to music while cooking at home on Tuesday evening and so a push notification with the copy 'Cooking something for dinner? We've got some soul food in this playlist' could be presented. Other examples of push notifications are included for situations where a user is stuck in traffic, hosting a dinner party or in the library studying. Such notifications may prompt a user to engage with that notification and initiate playback. One upside of the present invention is that by understanding user behaviour through the user profile context engine system, we can increase the amount of music listened to which may result in higher royalty payments to artists and increased user engagement for music services. Instead of waiting for a user to manually react to a situation by taking out their mobile device, finding suitable content and playing music, the system proactively encourages the listening of the right content at the right time.

Figure 12:
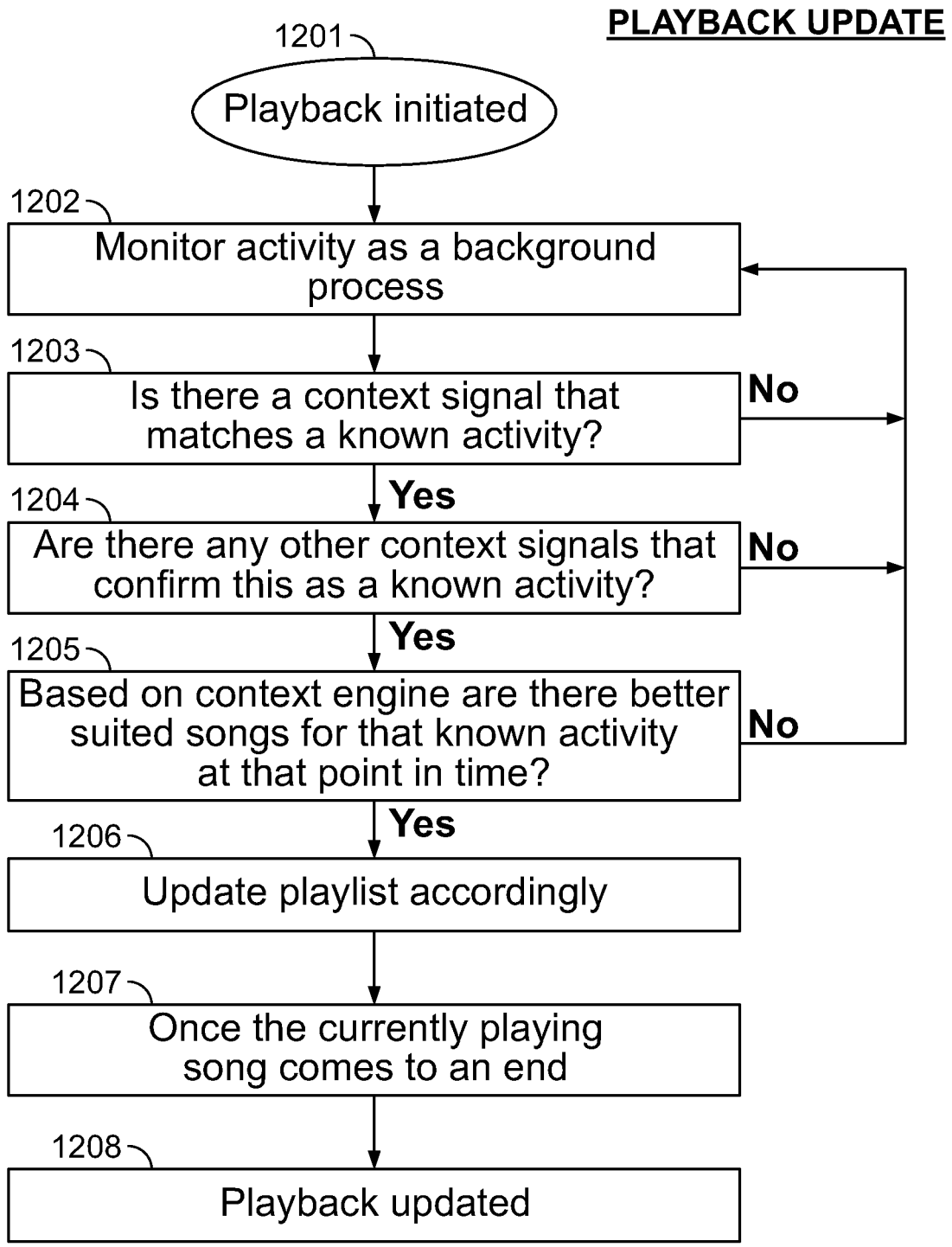
FIG. 12 is a schematic view of how the system can update playback based on context signals.

FIG. 12 is a schematic view of how the system can update playback based on context signals. Once playback is initiated 1201, the system can monitor activity as a background process 1202 and will check to see if it can find any context aware signal that matches a known activity 1203. If it cannot identify such an activity the monitoring process will continue 1202 until such a match is found. If any context signals are found that match a known activity at 1203, the system will check if there are any other context signals that will confirm the known activity 1204. If no such confirming context signal is found, the monitoring process will commence again 1202. If a subsequent context signal(s) confirms that the user is engaging in a known activity then the system will analyse, based on the applicable user profile context engine, if there are better suited songs for that known activity at that point in time 1205. If there are no better suited songs for that known activity in that point in time, the system will revert to the monitoring system 1202. If there are better suited songs for that known activity at that point of time 1205 then the system will update the playlist accordingly 1207 with the more suitable songs. Once the current playing song comes to an end 1207 playback is updated 1208 and the user will be able to enjoy the new songs while continuing to do that matched known activity.

Figure 13:
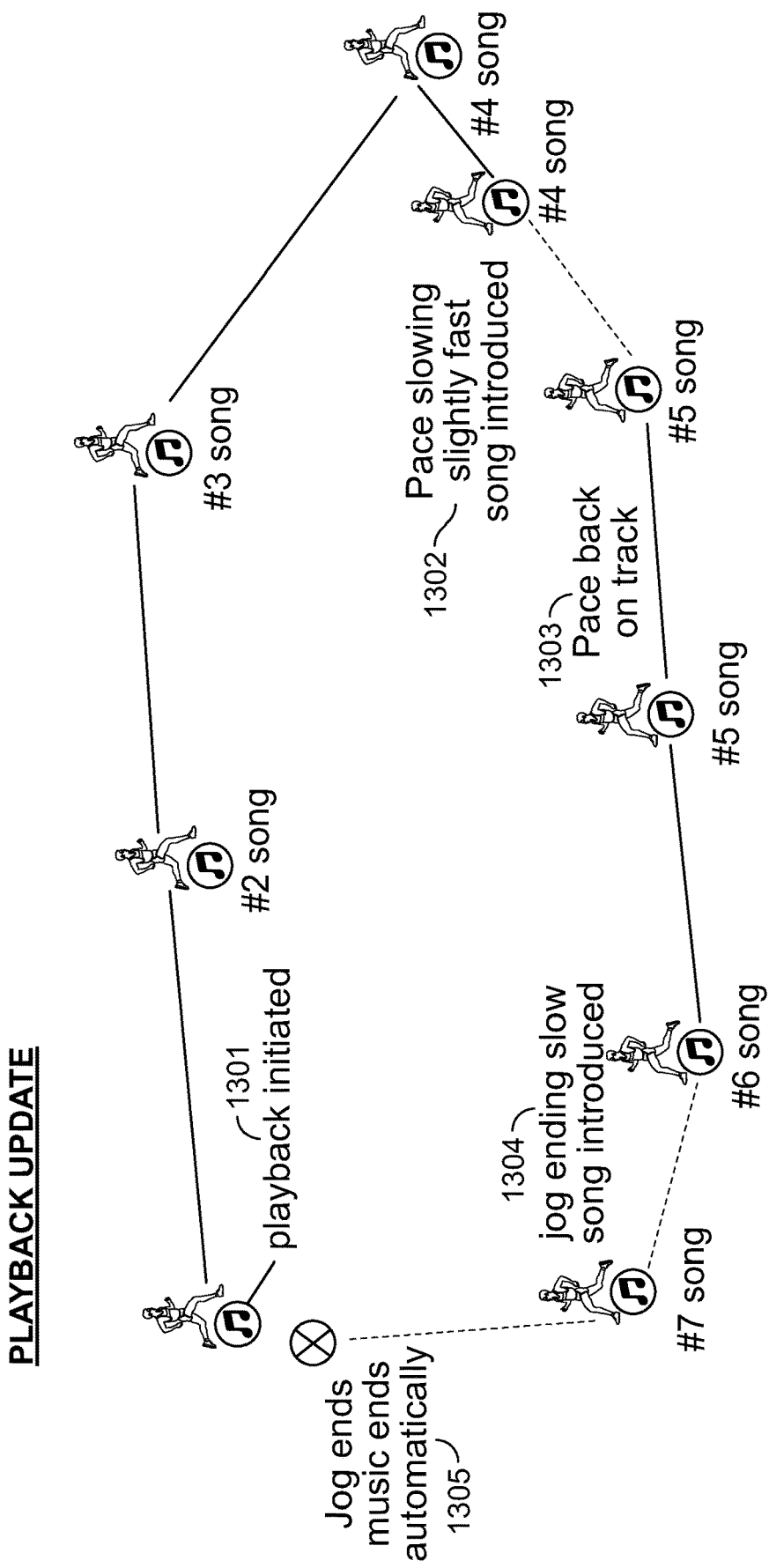
FIG. 13 is a diagram of a user going for a jog while listening to music using the system of playlist updating.

FIG. 13 is a diagram of a user going for a jog while listening to music using the system of playlist updating. When playback is initiated 1301, the system would first check for multiple context signals that confirm that the user is going for a run. Once confirmed, the system would then analyse the songs in the playlist that the user is listening to or about to listen to and check that there are no more suitable songs based on the user profile context engine for that particular activity. In this case, there are no updates required for playback through songs 1 through 4. Once it becomes known that the user's pace has slowed down (confirmed by motion signals from the user's mobile device) the system recognises that there is a more suitable song for that known activity and a faster tempo song is queued as the next song in the playlist 1302. Once that new songs is introduced, the monitoring process identifies that the pace has resumed to the original speed 1303 (confirmed by motion signals from the user's mobile device) and no further playback updates are required until the jog comes to an end 1304 and a slower song is then queued in the playlist to match that known warm-down activity. When the user finally comes to a complete stop, playback is terminated automatically 1305.

Figure 14:
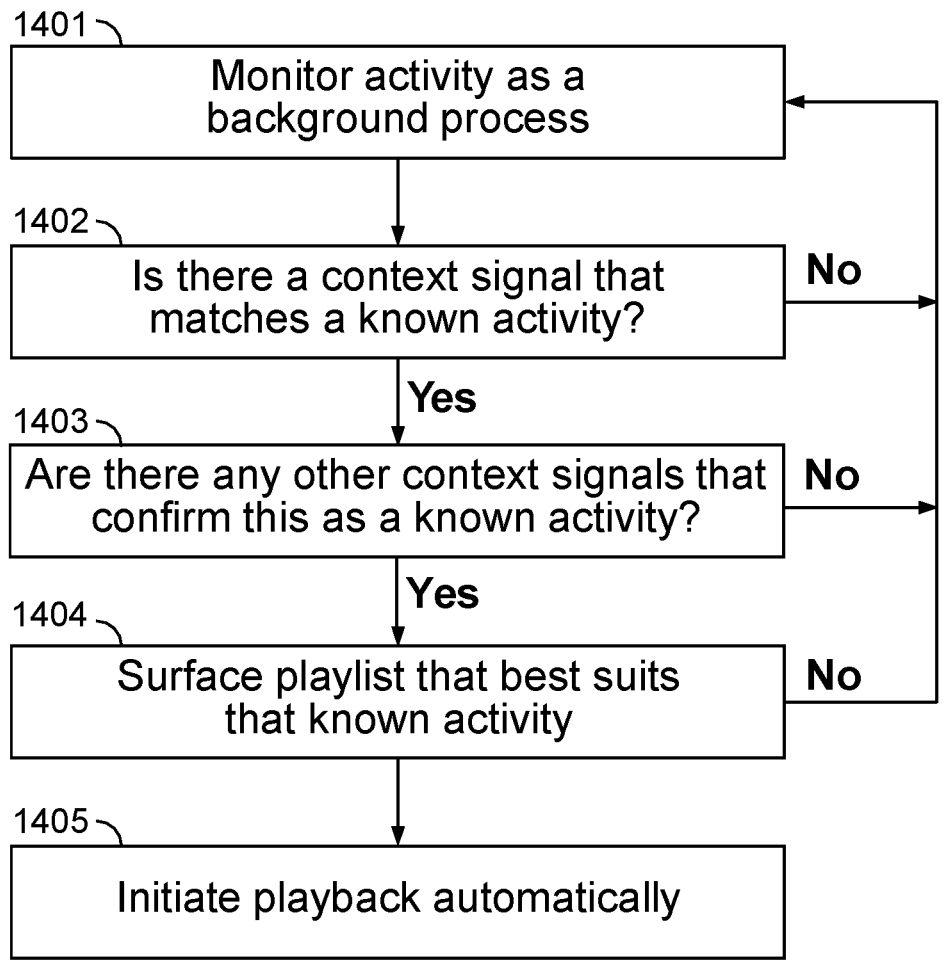
FIG. 14 is a schematic view of the automatic playback initiation of a playlist that is triggered by context signals.

FIG. 14 is a schematic view of the automatic playback initiation of a playlist that is triggered by context signals. For this system to work, the first step is to monitor any activity as background process 1401 on the user's mobile device. Next, it is checked to see if there is a context signal that matches a known activity 1402 (e.g., jogging). If no such context signal is found then the monitoring process continues 1401. The system next checks if there are any other context signals that would confirm that known activity 1403. If there are no such confirmation context signals, the monitoring process continues 1401 until another known activity is recognised. If there are other context signals that confirm this as a known activity then the system will surface a playlist that best suits that known activity 1404. Once the most suitable playlist has been identified, the system will finally initiate playback automatically 1405.

FIG. 15 is a diagram of a user going for a jog while using the system of automatic playback initiation. In this example, the user sends a series of context signals which are received and acted upon by the system which recognises that user is undertaking in a known activity (jogging) while listening to music. Here the user starts off in her house and decides to go for a jog 1501. The system is monitoring her activity in the background while she is at home. The first mobile signal is received when the user sends a location signal as she breaks the location geofence around her house 1502. The second context signal is received when the user plugs in her headphones and the system identifies that she is about to listen to music 1503. A final confirmation context signal is then received when the mobile signals on the user's mobile device signify that the user is in an active state of jogging 1504. The system, having recognised that the user is going for a jog, will then surface a playlist that best suits that known activity 1505 and will automatically initiate playback of that playlist 1506. The net result is that a user can walk out of her house, plug in her headphones and just starting running, safe in the knowledge that the best possible music for that situation will start playing automatically to accompany her on her run. This system is more efficient than the current alternative in the state of the art where the same user would have to pick a playlist to best suit the activity and then manually play it. Although not covered in the above description, it is intended that wearable devices (smart-watches etc) would also be able to operate in this system by both receiving mobile signals and initiating playback on the wearable device (if music playback is possible) or through another paired mobile device.

FIG. 16 is a table illustrating a typical day of a fictitious user monitoring their activity from the moment that the user's alarm clock is stopped, right up until that user goes to bed. In this example, we have labelled the real-life activity that the user is carrying out, the time that the activity started and finished, the number of songs that are played during that activity and the context signals that are available during that time. For example, in the first use case, the system recognises that the user has turned off their alarm at 7.34 am remaining in bed. The system also recognises that the user then opens up the music service, initiates playback and goes through the email on their phone. A list of available context signals and readings are listed including, but not limited to; (1) Light Sensor: Low; (2) Location: Home (3) Mobility: Static (4) Phone Orientation: Upright (5) Gesture Signals—typing on touchscreen keypad (6) Third party email app. By combining all available context data points, the user profile context engine can build up a pattern around specific use cases such as waking up and listening to music in bed while answering emails. During this activity, a total of three songs are played which are then classified by the system of context classification and would be labelled accordingly both for that particular user and globally for those three songs. We have developed a unique way of conditioning this context data and modelling it which is further described in FIGS. 19 and 20.

The next activity identified by the system is when the user moves to the bathroom, initiates playback and puts his phone down while he gets in the shower. A total of two songs are played during this activity and a number of context signals are picked up including, but not limited to, (1) Humidity Sensor: High (2) Light Sensor: High (3) Location: Home (4) Mobility: Phone flat and static (4) co-present wireless speakers in bathroom. In the foregoing example, it would be probable that if the humidity sensor went from low to high while the user remained in the house and this happened within one hour of waking up, then this activity signifies when that user is showering. However, the system utilises all available context signals to confirm that such a known activity is taking place and the additional presence of the wireless speakers in the bathroom with the static orientation of the phone ensures that there is sufficient confidence for the system to classify this activity as showering. The two songs played during this activity would also be labelled with this contextual data.

The next activity sees the user get into their car in the driveway and proceed to drive to college while listening to music in their car. A total of four songs are listened during this known activity which is labelled as driving. It should be noted that this activity is different to driving but being stuck in traffic which the subsequent use cases identifies. In 'driving' the context signals provided include (1) Location: Home geofence broken (2) Connects to car audio using co-present device signals (3) Mobility signals recognise that the user is driving. The four songs played during this activity are therefore classified based on this activity. When the car slows down and enters traffic, a new activity is recognised and the ensuing three songs are classified with the updated activity metadata. For the purposes of explaining this system, the other daily activities are not described in any further details as the methodology is hopefully now clear to the reader.

Hence it is possible to see how a full day of music listening is graphed with the various user behaviours that are identified throughout the day. It should be noted that the system can monitor user behaviour at all times of the day, not just when music playback has been initiated. Such an approach is not relevant for the purposes of this description though it can be imagined how such other contextual data could amplify the data modelling and user/song profiling over a specified period of time. It should also be noted that we are explicitly referring to music listening habits so far but any type of audio playback including podcasts, radio or otherwise could be equally as well classified and used to understand user behaviours and to provide curated content in the form of playlists or otherwise for the end user.

FIG. 17 is a table illustrating what songs a number of fictitious users listen to throughout the day. By tabling this information, it is possible to see how each particular songs is classified with a specific activity. In the first activity, the user John Doe is listening to 'Sussidio' by Phil Collins while cooking dinner in the evening in his home before hosting a dinner party. This activity is identified by the following context signals (1) Location: House (2) Time: 7.30 pm (3) Proximity Signal: connected to wireless speakers in kitchen (4) Co-present device owned by wife present in the room (5) Identification of 'dinner' string in event signal from calendar scheduled for 8.30 pm. By monitoring and recognising this activity, the system can proactively suggest a suitable playlist for consumption or can reactively prompt or trigger a suitable playlist for consumption. In the second activity, the user Mary Smith is listening to Antonio Vivaldi's 'Violin Concerto in E' while studying in the library with her friend Jane Cole. This is not a once off event and the system recognises that this song is listened to every week day with the same context signals present which include (1) Location: library (2) Time: between 9 am and 5 pm weekdays (3) Headphones in (4) Mobility is stationary (5) Co-present devices of User: Jane Cole present in library. Again, by classifying this song with those context signals we can build up a picture of how the user Mary Smith consumes music. This means that the system can proactively or reactively generate playlists best suited to that activity which Mary can then consume while studying. It is acknowledged that no other descriptions are required with this diagram for the purposes of explaining this process further.

FIG. 18 is a table illustrating how one particular song, 'Eye of the Tiger' by Survivor, is listened to by a number of users, each during their own unique activity. The first user Ben Player is going for a run with his work colleague at lunchtime around the office. The following context signals identify that particular activity (1) Location: Near work (2) Timing: 1.11 pm on a Tuesday (3) Connected to wearable device (4) Co-present device owned by colleague at work present throughout activity (5) Identification of 'go for jog' string in event signal from calendar (6) Mobility sensors detect jogging (7) Headphones in. This means that 'Eye of the Tiger' by Survivor will be labelled with this context data. The second user, Sophie Lopez is in the gym on a Wednesday morning running on a treadmill. The context signals used to identify this activity include (1) Location: gym (2) Time: 7.25 am on a Wednesday (3) Headphones in (4) Mobility is stationary (3) Biometric sensors show heart rate of 145 BPM (5) Proximity sensors pick up wireless speakers in gym. As can be seen by this example, context signal fusion allows certain activities to be identified that might not otherwise be recognised. Sophie Lopez is jogging (in the same sense that Ben Player is) but no mobility signals have broadcast that information. It takes a combination of the other available context signals to work out that Sophie Lopez is in fact running and this information is stored with the song 'Eye of the Tiger' just as Ben Player's activity was stored along with that song. In the last example of this diagram, the user Stephanie Chang is in the library when this song comes on as part of a general playlist that she is listening to. The fact that Stephanie skips this song is interesting of itself as it indicates that this song was not suitable for that particular activity. Some of the available context signals in this case include (1) Location: library (2) Time: 3.41 pm on a Friday (3) Headphones in (4) Mobility is stationary (5) Co-present devices of User: Sue Redden present in library (6) Full song not played, user skips it. This act is also recognised by the system as and the context engine is updated accordingly. This information is also added to the global context data associated with 'Eye of the Tiger' and such a data point may stop the song being queued in a library again (both for Stephanie and any other users of the system).

In this way it is possible to imagine how a rich layer of context data can be stored with any other song metadata using global activity readings from a network of users. By combining listening histories with context data, we are able to add a new dimension to understanding consumption patterns (e.g., why a song was listened to). It should also be noted that the lack of context signals for a particular song will also have an effect and may indicate that a particular song is more suitable for generic situations than specific activities. In short, there are added parameters to all music consumption (whether generated by the presence or absence of mobile signals) and these parameters help to provide a stronger consumption experience for an end user.

Figure 19:
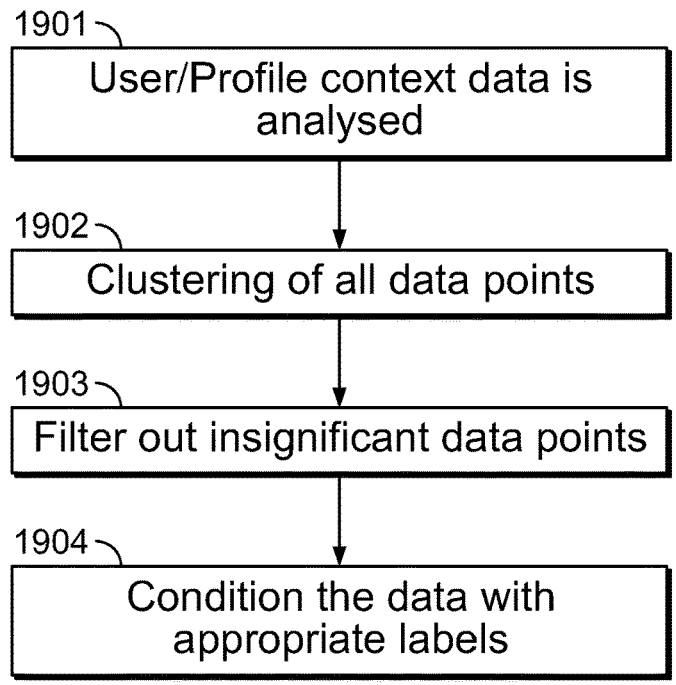
FIG. 19 is a schematic view of the system for input data conditioning.

FIG. 19 is a schematic view of the system for input data conditioning. As various context data points are built up either relating to a particular user or song, this context data is analysed 1901. The system then carries out some clustering of the aggregated data using well known techniques such as the k means clustering algorithm 1902. Once clustered, the context data is then filtered using other well-known data filtering algorithms 1903. Finally, the context data is conditioned with the appropriate labels 1904 so that known activities can be differentiated from one another and the right music can be affixed to these known activities which have been labelled.

Figure 20:
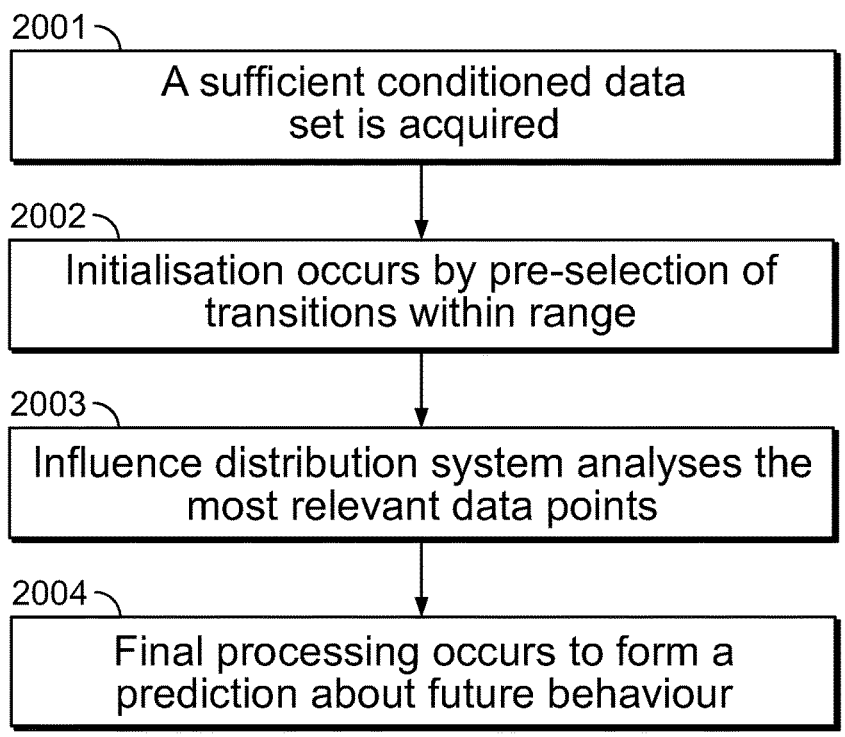
FIG. 20 is a schematic view of the data modelling technique used to predict user behaviour.

FIG. 20 is a schematic view of the data modelling technique used to predict user behaviour using transition probability. Once a sufficient data set is acquired 2001 which has been condition as outlined in FIG. 19, the system is able to carry out some data modelling to predict user behaviour using transition probability. The reader should note that this predictive algorithm has been identified as the most accurate for the purposes of predicting what activity a user might be doing at a future point of time and is relevant to this invention only. A number of other machine learning predictive algorithms including decision trees, linear machines, association rules, nearest neighbour classification and Markov chains, the results of which are beyond the scope of this application, were trialled but found to be suboptimal. Each has their own strengths and weaknesses. This is the case for two techniques in particular; nearest neighbor classification and Markov chains. Both of these are suboptimal on their own. The nearest neighbour which chronologically stores events in memory is excellent for predicting similarity of events at one point in time. Conversely, the Markov chain which is memory-less is excellent at predicting events into the future using random variables. By combining the two, we may improve their weaknesses. Transition probability is an attempt towards such a construction and this algorithm is split between initialization, influence distribution, and a final processing phase. Initialisation occurs by pre-selection of transitions within a specified range 2002. Next an influence distribution system analyses the most relevant data points 2003. The final processing then occurs to form a prediction about future behaviour 2004.

To explain this process in further detail, some pseudo code has been set out below which outlines the steps in this predictive algorithm.

```
Prediction getPrediction(prediction time Pt, prediction range Pr){
//preselection for every (Transition t in all recorded transitions){
    if(t.time is between Pt - Pr and Pt + Pr){
    select t;
    select t.startActivity;
    select t.endActivity;
    }
}
//calculate number of occurrences per activity
for(Day d = first day ; d before current day ; d = next day){
Activity s = the activity at time Pt - Pr on day d;
occurrences(s)++ ;
```

```
}
//calculate number of times reached per activity
//init
    for every(selected activity s){
        reached(s) = occurrences(s);
    }
//count for every(selected transition t){
        reached(t.endActivity)++;
    }
//distribute points
//init for every(selected activity s){
    result(s) = 0;
}
//distribute total amount of points Tp = 0;
for every(selected activity s){
    initial points = currentActivity.similarityTo(s) * occurences(s);
    CALL distribute(s ,initial points,result);
    Tp += initial points;
//final processing of result
//init for every(feature-value combination fv){
    prediction(fv)=0;
}
//process
for every(selected activity s){
    for every(feature-value combination fv contained in s){
        prediction(fv) += result(s) / Tp;
    }
} return prediction;
}
void distribute(current activity, points,result){
    keep = points;
    for every(Transition t in selected transitions){
        if( current activity == t.startActivity AND NOT t already processed ){
            give = points / reached(current activity) * time distribution(t.time);
            keep -= give
            CALL distribute(t.endActivity,give,result)
        }
    } result(current activity) += keep
}
```

Such a predictive algorithm allows the system to work out what activity a user is likely to do next and provides the ability to send push notifications in advance or to surface playlists which can be consumed once any confirmation is forthcoming that such a known activity is taking place.

Thus the reader will see that at least one embodiment of the system provides a new and improved way for recognising and indexing context signals on a mobile device in order to generate contextual playlists and control playback. Furthermore, the method and apparatus described has the additional advantages in that:

it identifies content in the most efficient manner possible using complimentary methods to ensure that the correct song is identified;
it allows for the graphing of music tastes by understanding what music a user has been listening to;
it allows for the recognition of context signals using a number of different modules;
it allows for the indexation of these context signals using a number of different modules;
it allows for a user profile to be built up over time by understanding such context signals;
it allows for a song profile to be built up over time by understanding such context signals,
it allows for the marriage of such context signals with song metadata on a local and global scale;
it allows for the monitoring and confirmation of a known activity;
it allows for playlists to be generated in real-time and updated according to the known activity of a user;
it provides a mechanism for predicting user behaviour in the future;
it allows for playlists to be suggested prior to a known activity being confirmed;
it provides a mechanism for users to then consume the songs that have been generated for any known activity;
it allows for the automatic control of audio playback using the context signals during any known activity.

In accordance with an embodiment, an apparatus comprises: at least one processor; at least one memory including computer program code, at least one memory and the computer program code configured to, with the at least one processor, cause the apparatus to perform at least the following; identifying music preferences by understanding the listening history of a user.

In accordance with an embodiment, the at least one processor and the at least one memory are further configured to initiate: the recognition of context signals when listening to music.

In accordance with an embodiment, the context signals comprise one or more signals from a mobile device and said apparatus generates metadata based on said context signals in order to improve music recommendation to a user.

In accordance with an embodiment, the at least one processor and the at least one memory are further configured to initiate: the indexation of context signals when listening to music.

In accordance with an embodiment, the improvement of matching process by adapting to the best playlist for a specific situation.

In accordance with an embodiment, the system uses data conditioning and modelling to predict and accommodate user behaviour.

In accordance with an embodiment, the system optimises audio playback functionality.

In accordance with an embodiment, a method causes an apparatus to perform at least the following; identifying music preferences by understanding the listening history of a user from one or more context signals associated with a user mobile device.

While the above description contains many specificities, these should not be construed as limitations on the scope, but rather as an exemplification of one or several embodiments thereof. Many other variations are possible. Accordingly, the scope should be determined not by the embodiments illustrated, but by the appended claims and their legal equivalents.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g., CD-ROM, or magnetic recording medium, e.g., a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

What is claimed is:

1. An apparatus for generating a playlist based on a context for a user, the apparatus comprising:
    at least one processor;
    at least one memory including a computer program code, wherein the at least one memory and computer program code are configured to, with the at least one processor, cause the apparatus to:
    build, for each user of one or more users, a user profile that associates playback of music items by the user with a contextual metadata, including:
        receiving, from one or more devices associated with the user, a plurality of context signals including one or more sensor signals provided by a mobile device, in response to the user playing one or more music items while performing one or more activities;
        determining, for the user, and each activity, a contextual metadata associated with the one or more music items played, based on the context signals; and
        storing, in the user profile, the contextual metadata associated with the one or more music items played by the user during each activity, including an indication of the activity as a known activity and context signals and a number of music items associated therewith;
    build, for each music item of a plurality of music items, a song context data, including:
        receiving data indicative of the music item having been played by a plurality of users; and
        storing, in the song context data, contextual metadata for the music item, as determined from a plurality of user profiles associated with the plurality of users, including an indication, for each user, of the one or more sensor signals provided by the mobile device of the user and associated with the music item, and a plurality of activities determined by reference to the one or more sensor signals provided by the mobile device of each user; and
    determine a playlist for a particular user and a particular activity, including:
        receiving context signals including one or more sensor signals provided by a mobile device;
        determining, based on matching the received context signals with one or more song context data and the user profile for the particular user, the particular activity as being a known activity;
        receiving one or more additional context signals that confirm the particular activity as being the known activity;
        determining one or more music items to be associated with the particular activity, by reference to the contextual metadata determined from the plurality of user profiles and stored in the song context data for the one or more music items, and the user profile for the particular user; and
        providing a push notification to the user of a playlist including the one or more music items, in association with the user engaging in the particular activity, and if the user does not initiate playback of a music item in response to the push notification, updating the user profile for the user to improve operation of the push notification system.

2. The apparatus of claim 1, wherein the at least one processor and the at least one memory are further configured to initiate determination of the plurality of context signals when an item of music is played by the user.

3. The apparatus of claim 1, wherein the at least one processor and the at least one memory are further configured to initiate indexation of the plurality of context signals when an item of music is played by the user.

4. The apparatus of claim 1, wherein:
    the at least one processor and the at least one memory are further configured to cause the apparatus to:
    monitor the one or more sensor signals received from the one or more devices, to determine a matching trigger event, based on one or both of the user profile or the song context data for a particular music item, and
    in response to determining the matching trigger event, send a notification to a media device associated with the user, wherein the notification indicates a suggested playlist of music items.

5. The apparatus of claim 1, wherein data conditioning and modelling are used to predict a user behaviour and determine the particular activity for the particular user.

6. The apparatus of claim 1, wherein the at least one processor and the at least one memory are further configured to determine a set of most common context signals received for a particular music item.

7. The apparatus of claim 1, wherein one or more of the sensor signals are received from a co-present device in proximity of the user.

8. The apparatus of claim 1, wherein the apparatus is further caused to update the playlist to include new items of music, in response to determining one or more additional items of music for use with the particular activity, based on the contextual metadata associated with the one or more additional items of music and indicative of the particular activity.

9. The apparatus of claim 1, wherein the at least one processor and the at least one memory are further configured to predict an activity to be performed next by the particular user, by reference to one or more of the user profile for the particular user or the song context data, and the push notification is provided to the user in advance of the activity predicted to be performed.

10. The apparatus of claim 1, wherein the contextual metadata for a particular music item is associated with an indication of one or more known activities associated therewith.

11. A method for generating a playlist based on a context for a user, the method being performed by an apparatus having at least one processor, and at least one memory including a computer program code, the method comprising:
    building, for each user of one or more users, a user profile that associates playback of music items by the user with a contextual metadata, including:
        receiving, from one or more devices associated with the user, a plurality of context signals including one or more sensor signals provided by a mobile device, in response to the user playing one or more music items while performing one or more activities;
        determining, for the user, and each activity, a contextual metadata associated with the one or more music items played, based on the context signals; and
        storing, in the user profile, the contextual metadata associated with the one or more music items played by the user during each activity, including an indication of the activity as a known activity and context signals and a number of music items associated therewith;

building, for each music item of a plurality of music items, a song context data, including:
  receiving data indicative of the music item having been played by a plurality of users; and
  storing, in the song context data, contextual metadata for the music item, as determined from a plurality of user profiles associated with the plurality of users, including an indication, for each user, of the one or more sensor signals provided by the mobile device of the user and associated with the music item, and a plurality of activities determined by reference to the one or more sensor signals provided by the mobile device of each user; and determining a playlist for a particular user and a particular activity, including:
  receiving context signals including one or more sensor signals provided by a mobile device;
  determining, based on matching the received context signals with one or more song context data and the user profile for the particular user, the particular activity as being a known activity;
  receiving one or more additional context signals that confirm the particular activity as being the known activity;
  determining one or more music items to be associated with the particular activity, by reference to the contextual metadata determined from the plurality of user profiles and stored in the song context data for the one or more music items, and the user profile for the particular user; and
  providing a push notification to the user of a playlist including the one or more music items, in association with the user engaging in the particular activity, and if the user does not initiate playback of a music item in response to the push notification, updating the user profile for the user to improve operation of the push notification system.

12. The method of claim 11, wherein the at least one processor and the at least one memory are configured to initiate indexation of the plurality of context signals when an item of music is played by the user.

13. The method of claim 11, further comprising:
monitoring the one or more sensor signals received from the one or more devices, to determine a matching trigger event, based on one or both of the user profile or the song context data for a particular music item, and
in response to determining the matching trigger event, sending a notification to a media device associated with the user, wherein the notification indicates a suggested playlist of music items.

14. The method of claim 11, further comprising determining a set of most common context signals received for a particular music item.

15. The method of claim 11, wherein one or more of the sensor signals are received from a co-present device in proximity of the user.

16. The method of claim 11, further comprising updating the playlist to include new items of music, in response to determining one or more additional items of music for use with the particular activity, based on the contextual metadata associated with the one or more additional items of music and indicative of the particular activity.

17. A storage medium having computer program instructions stored thereon to cause an apparatus having at least one processor, and at least one memory, to carry out a method comprising:
building, for each user of one or more users, a user profile that associates playback of music items by the user with a contextual metadata, including:
  receiving, from one or more devices associated with the user, a plurality of context signals including one or more sensor signals provided by a mobile device, in response to the user playing one or more music items while performing one or more activities;
  determining, for the user, and each activity, a contextual metadata associated with the one or more music items played, based on the context signals; and
  storing, in the user profile, the contextual metadata associated with the one or more music items played by the user during each activity, including an indication of the activity as a known activity and context signals and a number of music items associated therewith;

building, for each music item of a plurality of music items, a song context data, including:
  receiving data indicative of the music item having been played by a plurality of users; and
  storing, in the song context data, contextual metadata for the music item, as determined from a plurality of user profiles associated with the plurality of users, including an indication, for each user, of the one or more sensor signals provided by the mobile device of the user and associated with the music item, and a plurality of activities determined by reference to the one or more sensor signals provided by the mobile device of each user; and determining a playlist for a particular user and a particular activity, including:
  receiving context signals including one or more sensor signals provided by a mobile device;
  determining, based on matching the received context signals with one or more song context data and the user profile for the particular user, the particular activity as being a known activity;
  receiving one or more additional context signals that confirm the particular activity as being the known activity;
  determining one or more music items to be associated with the particular activity, by reference to the contextual metadata determined from the plurality of user profiles and stored in the song context data for the one or more music items, and the user profile for the particular user; and
  providing a push notification to the user of a playlist including the one or more music items, in association with the user engaging in the particular activity, and if the user does not initiate playback of a music item in response to the push notification, updating the user profile for the user to improve operation of the push notification system.

18. The storage medium of claim 17, wherein the plurality of context signals comprise one or more signals from a mobile device, and wherein the method further comprises generating the contextual metadata based on the plurality of context signals in order to improve music recommendation to a user.

19. The storage medium of claim 17, wherein the at least one processor and the at least one memory are configured to initiate indexation of the plurality of context signals when an item of music is played by the user.

20. The storage medium of claim 17, wherein the computer program instructions further cause the apparatus to:
- monitor the one or more sensor signals received from the one or more devices, to determine a matching trigger event, based on one or both of the user profile or the song context data for a particular music item, and
- in response to determining the matching trigger event, send a notification to a media device associated with the user, wherein the notification indicates a suggested playlist of music items.

* * * * *